United States Patent
Hayakawa et al.

(10) Patent No.: US 8,630,026 B2
(45) Date of Patent: Jan. 14, 2014

(54) IMAGE PROCESSING METHOD, IMAGE PROCESSING APPARATUS, AND STORAGE MEDIUM FOR DETERMINING AN AREA IN A READ IMAGE

(75) Inventors: Mizuki Hayakawa, Kawasaki (JP); Kan Kitagawa, Yokohama (JP); Yusuke Hattori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 12/823,920

(22) Filed: Jun. 25, 2010

(65) Prior Publication Data

US 2011/0002015 A1  Jan. 6, 2011

(30) Foreign Application Priority Data

Jul. 3, 2009 (JP) ................................. 2009-159259

(51) Int. Cl.
*H04N 1/04* (2006.01)
(52) U.S. Cl.
USPC ............................. 358/474; 358/448; 358/488
(58) Field of Classification Search
None
See application file for complete search history.

(56) References Cited

U.S. PATENT DOCUMENTS

| 5,880,858 | A  | * | 3/1999  | Jin ................................. | 358/487 |
| 5,974,199 | A  | * | 10/1999 | Lee et al. ...................... | 382/289 |
| 6,898,316 | B2 | * | 5/2005  | Zhou .............................. | 382/190 |
| 7,471,423 | B2 |   | 12/2008 | Maki |         |
| 8,149,478 | B2 | * | 4/2012  | Onishi ........................... | 358/488 |
| 8,264,751 | B2 | * | 9/2012  | Matsui ........................... | 358/488 |
| 8,289,584 | B2 | * | 10/2012 | Ando et al. .................... | 358/474 |
| 8,294,960 | B2 | * | 10/2012 | Fujishita ........................ | 358/488 |
| 8,391,593 | B2 | * | 3/2013  | Lin et al. ....................... | 382/164 |
| 8,451,504 | B2 | * | 5/2013  | Xu et al. ....................... | 358/3.26 |
| 2003/0059111 | A1 | * | 3/2003  | Druitt et al. ................... | 382/173 |
| 2006/0119902 | A1 | * | 6/2006  | Ahmed et al. ................. | 358/474 |
| 2006/0221411 | A1 | * | 10/2006 | Aoki .............................. | 358/474 |
| 2007/0013974 | A1 | * | 1/2007  | Hattori ........................... | 358/486 |
| 2009/0273816 | A1 | * | 11/2009 | Ando et al. .................... | 358/474 |
| 2009/0273818 | A1 | * | 11/2009 | Matsui ........................... | 358/488 |
| 2010/0165417 | A1 | * | 7/2010  | Hayakawa ..................... | 358/453 |
| 2010/0214584 | A1 | * | 8/2010  | Takahashi ...................... | 358/1.9 |

FOREIGN PATENT DOCUMENTS

| JP | 2000-232562 A | 8/2000 |
| JP | 2001-274958 A | 10/2001 |
| JP | 2003-046731 A | 2/2003 |
| JP | 2003-153005 A | 5/2003 |
| JP | 3781192 B2 | 5/2006 |
| JP | 2007-020122 A | 1/2007 |

* cited by examiner

*Primary Examiner* — Dung Tran
(74) *Attorney, Agent, or Firm* — Canon USA, Inc., IP Division

(57) ABSTRACT

There is provided an image processing method which determines the area of a document from an image read on a transparent platen, the image processing method also determines a single object area or a plurality of object areas from the image on the transparent platen, and when the luminance of the area in which the object area is removed from the image on the transparent platen is detected to determine the document area, the image processing method detects whether or not an image of a shadow exists around the periphery of the object area on the image of the transparent platen, and the threshold value used for determining the document area is different depending on whether a shadow is detected.

18 Claims, 17 Drawing Sheets

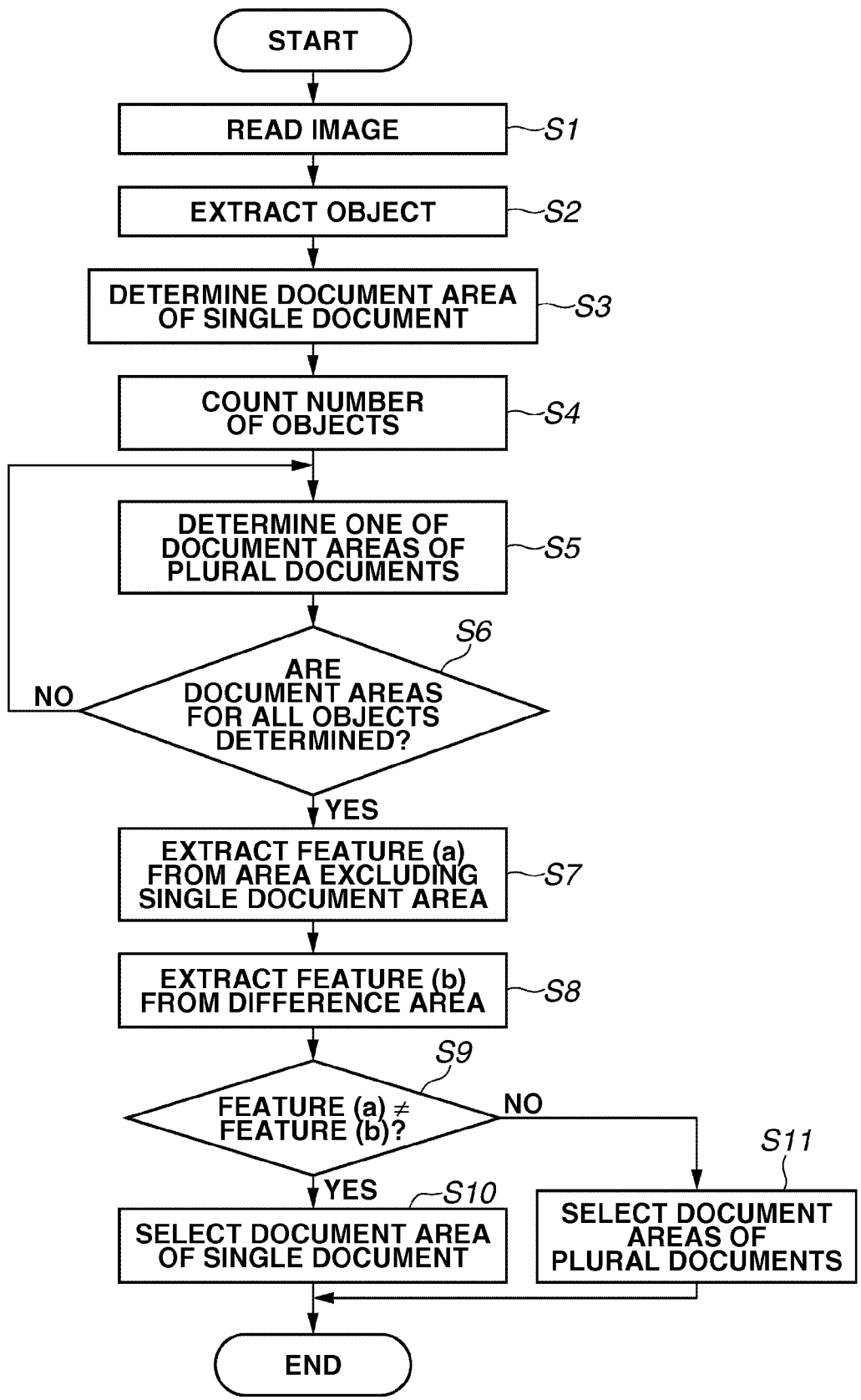

71
IMAGE OF SINGLE
MANUSCRIPT
OF MAGAZINE

72
IMAGES OF TWO
PHOTOGRAPHIC
DOCUMENTS

73
EXTRACTION RESULT IN
THE CASE WHERE SINGLE
MANUSCRIPT OF
MAGAZINE IS PLACED

74
EXTRACTION RESULT
IN THE CASE WHERE
PLURAL PHOTOGRAPHIC
DOCUMENTS ARE PLACED

R11
AREA OBTAINED
FROM IMAGE
READ WHEN SINGLE
MANUSCRIPT OF
MAGAZINE IS PLACED

R12
AREA OBTAINED
FROM IMAGE
READ WHEN PLURAL
PHOTOGRAPHIC
DOCUMENTS ARE PLACED

R21 AREA

R22 AREA

R23 AREA

R24 AREA

AREA R11
R31 AREA

AREA R12
R32 AREA

190 IMAGE

R51 AREA OBTAINED FROM IMAGE READ WHEN SINGLE PHOTOGRAPHIC DOCUMENT AND SINGLE CD ARE PLACED

R61 AREA
R61E
R62 AREA
R62E

AREA R51

191 AREA EXCLUDING SINGLE DOCUMENT AREA

DIFFERENCE AREA 192   AREA R61

R62 AREA

LUMINANCE HISTOGRAM 203

LUMINANCE HISTOGRAM 204

IMAGE PROCESSING METHOD, IMAGE PROCESSING APPARATUS, AND STORAGE MEDIUM FOR DETERMINING AN AREA IN A READ IMAGE

BACKGROUND OF THE INVENTION

1. Field of the Invention

The present invention relates to an image processing apparatus which reads a document placed on a transparent platen of an image reading apparatus, processes the read image, and outputs the processed image and, in particular, to the image processing apparatus which collectively reads a plurality of documents placed on the transparent platen and outputs the images on a document-by-document basis.

2. Description of the Related Art

In recent years, image information is frequently dealt with along with the development of a communication network, an increase in the speed of a computer, and an increase in the capacity of a storage medium. There is an increasing demand for accurate and high-speed reading of image information scanned particularly by a scanner and the like. Up to now, there has been known a method for extracting an object from the document placed on a transparent platen to automatically determine a document area such as a document position and a document size. A first method determines a document area based on all the extracted objects. The first method is effective when it is previously known that only a single document is placed. A second method extracts an individual object from a plurality of objects and determines a document area based on the extracted individual objects. The second method does not limit a document to a single one, therefore, for each individual object, an area of the document can be determined respectively.

SUMMARY OF THE INVENTION

According to an aspect of the present invention, an image processing method includes reading an image on a transparent platen on which a single document or a plurality of documents is placed and which is covered by a platen cover, through the transparent platen; determining a single object area or a plurality of object areas from the image on the transparent platen (a first determination); determining an area including all the object areas determined in the first determination as a first area (a second determination); determining a set of the object areas determined in the first determination as a second area (a third determination); determining an area in which the first area is removed from the image on the transparent platen, as a third area and determining the feature quantity of the image in the third area as a first feature quantity (a fourth determination); determining an area in which the second and the third area are removed from the image on the transparent platen, as a fourth area and determining the feature quantity of the image in the fourth area as a second feature quantity (a fifth determination); and determining that, if a difference between the first and the second feature quantity is equal to or smaller than a first threshold value, each of the object areas is an image of each of a plural documents and, if the difference is greater than the first threshold value, the first area is an area of one document; wherein the image processing method further comprises detecting whether an image of a shadow exists, which is generated if the object is a thick document around the periphery of the object area on the image of the transparent platen, and if the shadow is detected, a second threshold value greater than the first threshold value is used in the above determination instead of the first threshold value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flow chart illustrating a reading operation according to the exemplary embodiment.

DESCRIPTION OF THE EMBODIMENTS

Various exemplary embodiments, features, and aspects of the invention will be described in detail below with reference to the drawings.

Figure 1:
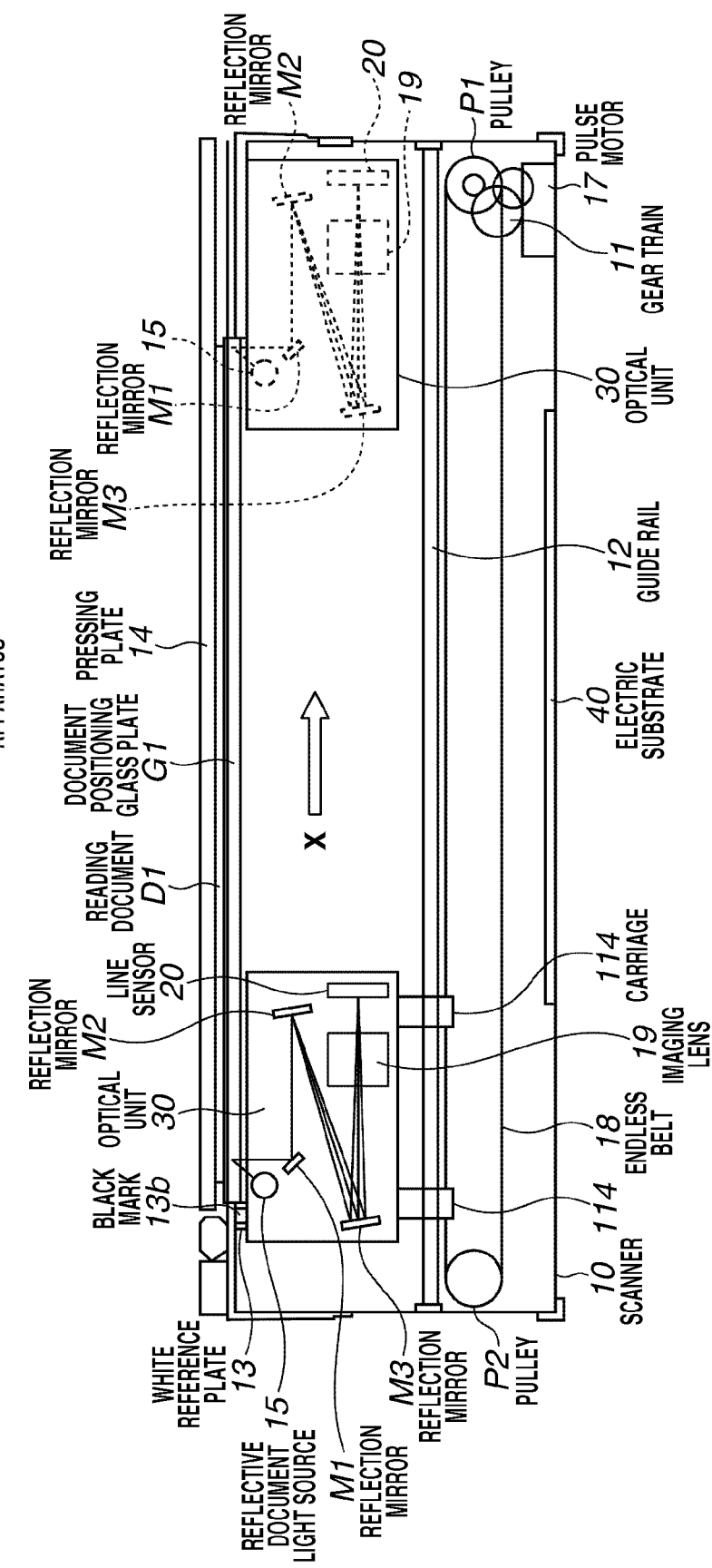
FIG. 1 is a cross section illustrating an image reading apparatus according to the exemplary embodiment of the present invention.

FIG. 1 is a cross section illustrating an image reading apparatus RE1 according to the exemplary embodiment of the present invention. The image reading apparatus RE1 includes a scanner 10, and a reading document D1 is placed thereon. The scanner 10 is connected to a host computer (hereinafter referred to as "host PC") which is an information processing apparatus, via an interface cable (not illustrated). The image reading apparatus RE1 includes pulleys P1 and P2, a document positioning glass plate (transparent platen) G1, a gear train 11, a guide rail 12, a white reference plate 13, a pressing plate 14, a pulse motor 17, an endless belt 18, an optical unit 30, and an electric substrate 40. A black mark 13b is provided in the white reference plate 13. The scanner 10 determines a reading area with the black mark 13b as a reference and reads an image. The optical unit 30 is electrically connected to the pulse motor 17 via a cable (not illustrated). The optical unit 30 is mounted on a carriage 114 and slidable along the guide rail 12. The carriage 114 is fixed to the endless belt 18. The optical unit 30 includes a reflective document light source 15, a plurality of reflection mirrors M1, M2, and M3, an imaging lens 19, and a line sensor 20, which is an imaging unit.

The following describes how the scanner 10 reads a reflective document image. When the host PC issues a reading command, the scanner 10 starts a reading operation. The scanner 10 turns on the reflective document light source 15 of the optical unit 30. Light reflected from the reading document D1 is reflected by the plurality of reflection mirrors M1, M2, and M3 and imaged on the line sensor 20 via the imaging lens 19, thereby the line sensor 20 reads an image corresponding to one line in the main scanning direction. The power of the pulse motor 17 rotates the pulley P1 via the gear train 11 to drive the endless belt 18. This moves the optical unit 30 fixed to the carriage 114 on the guide rail 12 in the sub scanning direction indicated by an arrow X. The scanner 10 repeats the reading of line images in the main scanning direction while moving the optical unit 30 in the sub scanning direction until the optical unit 30 reaches the position indicated by a dotted line in FIG. 1, thereby scanning the entire surface of the document positioning glass plate G1. The scanner 10 can read a partial image of the document on the document positioning glass plate G1 depending on contents of a reading command from the host PC.

In this case, in the image reading area specified by the host PC, the scanner 10 can read a partial image of the document D1 on the document positioning glass plate G1 by the control unit on the electric substrate 40 regulating the image area used among the output of the sensor in the main scanning direction. The scanner 10 can also read a partial image of the document D1 on the document positioning glass plate G1 by the control unit on the electric substrate 40 regulating the moving area of the optical unit 30 in the sub scanning direction. When the optical unit 30 is moved in the sub scanning direction, a system controller 41 selects speed according to an image reading resolution setting specified by the host PC and reads an image. The scanner 10 has a multi-crop scan function in which a plurality of reading documents D1 placed on the document positioning glass plate G1 is automatically read in sequence by the control of the host PC or the scanner 10 itself. An operation panel (not illustrated) is disposed on the pressing plate 14. The operation panel is provided with a liquid crystal screen and a button. A user inputs multi-crop parameters into the scanner 10 via the operation panel to perform operation such as starting reading.

Figure 2:
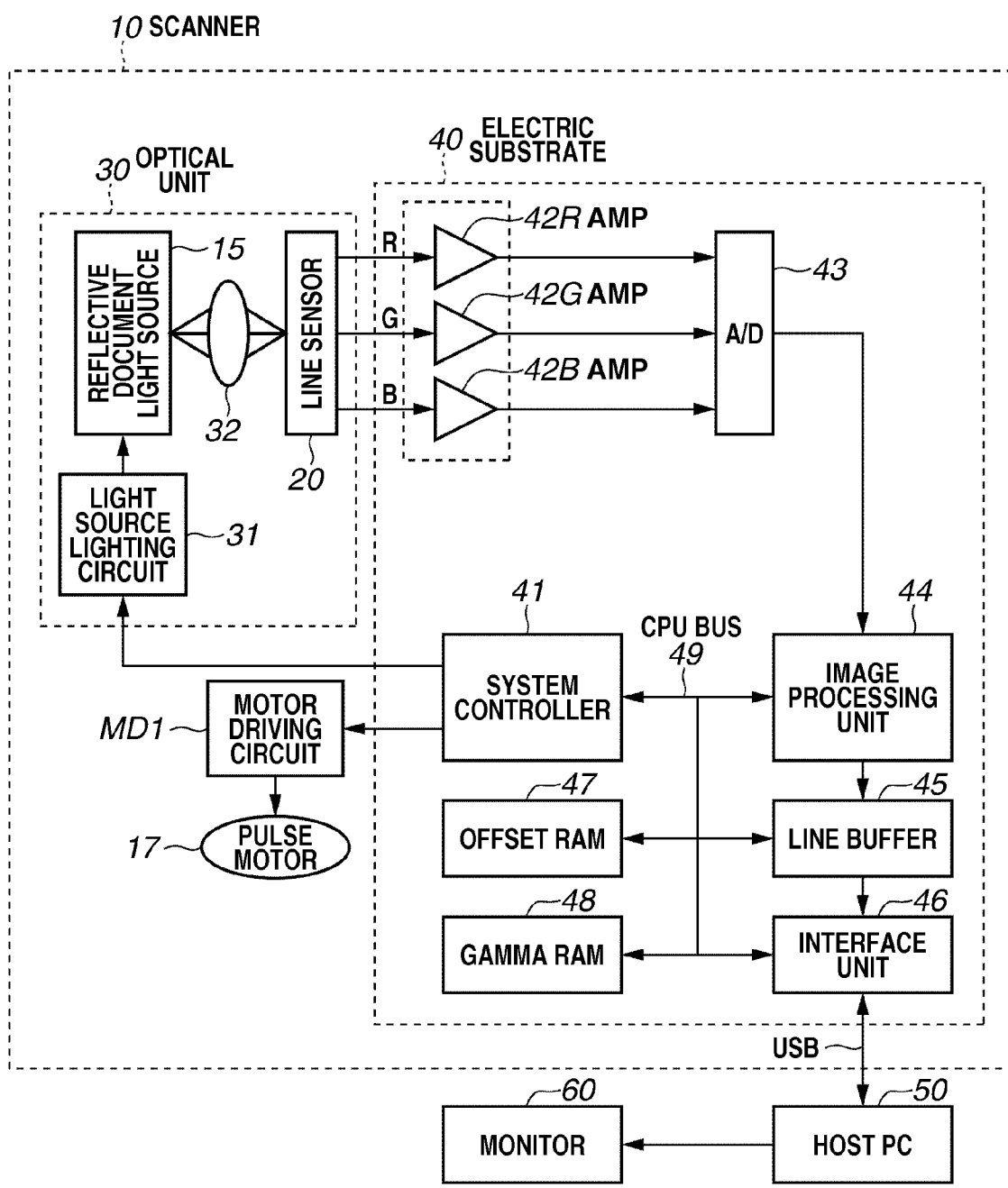
FIG. 2 is a block diagram illustrating a functional configuration of a scanner according to the exemplary embodiment.

FIG. 2 is a block diagram of a functional configuration of the scanner 10. The scanner 10 includes the optical unit 30, the electric substrate 40, the pulse motor 17, and a motor driving circuit MD1. The optical unit 30 includes a light source lighting circuit 31. The light source lighting circuit 31 turns on a reflective document light source 15 and includes a detection unit for detecting the light quantity of the reflective document light source 15. When a cold cathode tube is used in the reflective document light source 15, a so-called inverter circuit is formed.

The electric substrate 40 includes the system controller 41, analog gain adjustors 42R, 42G, and 42B, an A/D converter 43, an image processing unit 44, a line buffer 45, and an interface unit 46. The electric substrate 40 further includes an offset RAM47, a gamma RAM 48, and a CPU buss 49. The analog gain adjustors 42R, 42G, and 42B variably amplify the analog image signals output from the line sensor 20. The A/D converter 43 converts the analog image signals output from the analog gain adjustors 42R, 42G, and 42B into a digital image signal. The image processing unit 44 subjects the digital image signal to image processing such as an offset correction, a shading correction, a digital gain adjustment, a color balance adjustment, masking, a resolution conversion in the main and the sub scanning direction, and an image compression. The line buffer 45 temporarily stores image data and has a general-purpose random access memory. The interface unit 46 communicates with the host PC 50 and includes a USB interface. Another interface such as an IEEE 1394 interface may be used as the interface unit 46.

The offset RAM47 is used as a working area where images are processed and used to correct offset between the RGB lines because the line sensors for RGB have their respective predetermined offset and are arranged in parallel to the line sensor 20. The offset RAM47 temporarily stores various data such as shading correction. The offset RAM47 is realized by a general-purpose random access memory. The gamma RAM 48 stores a gamma curve and performs a gamma correction. The system controller 41 stores the sequence of the entire film scanner and performs various controls according to the command of the host PC 50. The CPU bus 49 connects the system controller 41, the image processing unit 44, the line buffer 45, the interface unit 46, the offset RAM 47, and the gamma RAM 48 to one another and includes an address bus and a data bus. The data driving circuit MD1 is used for a pulse motor 17 and outputs an excitation switching signal for the pulse motor 17 by a signal from the system controller 41, which is the system control unit of the scanner 10.

Figure 3:
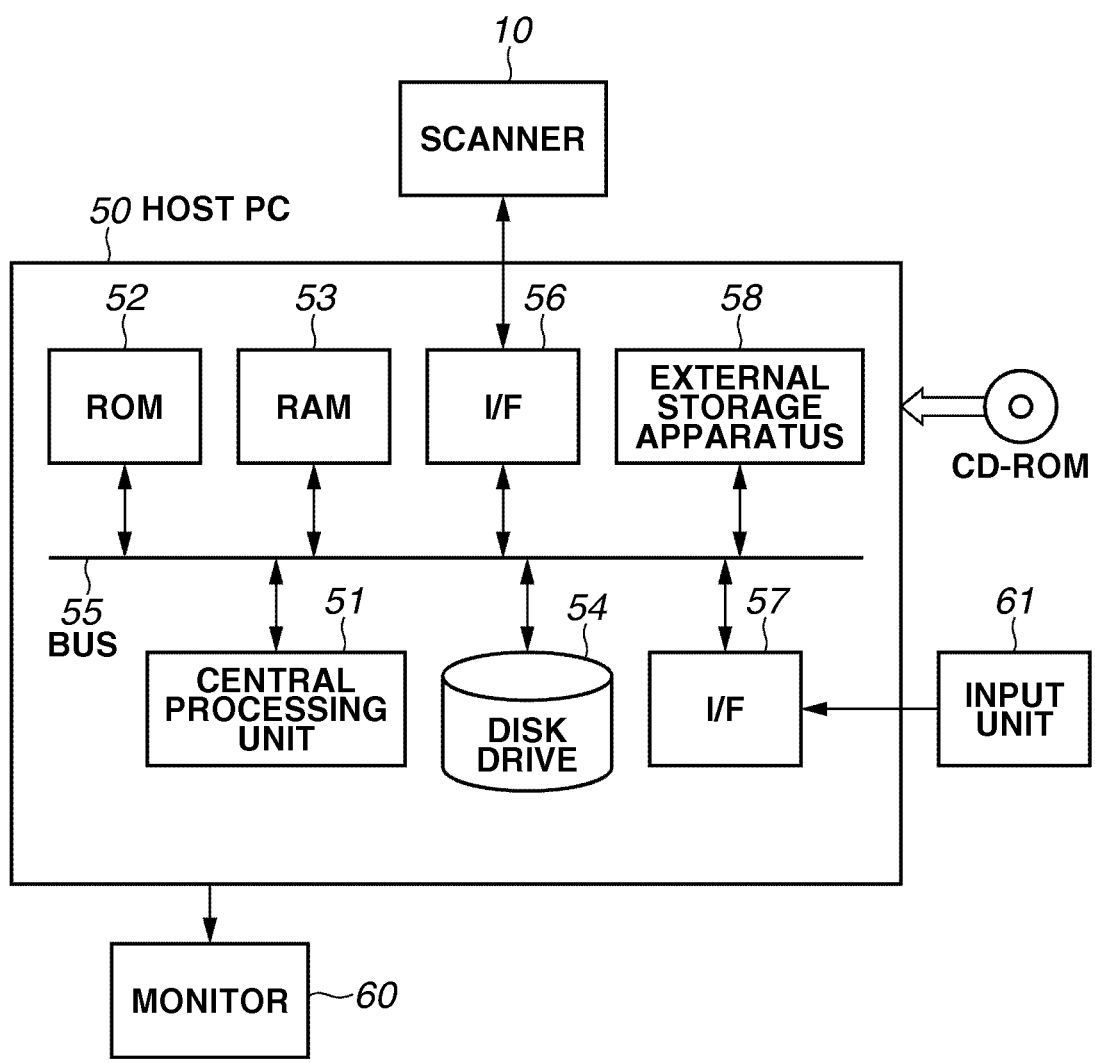
FIG. 3 is a block diagram illustrating the schematic configuration of a host PC according to the exemplary embodiment.

The schematic configuration of the host PC 50 used for controlling the scanner 10 is described below. FIG. 3 is a block diagram illustrating the schematic configuration of the host PC 50 used for controlling the scanner 10. The host PC 50 includes a central processing unit 51, a ROM 52, a RAM 53, a disk drive 54, a bus 55, I/Fs 56 and 57, and an external storage apparatus 58. The ROM 52 stores a program for realizing the operation of a flow chart illustrated in FIG. 4. The RAM 53 provides a storage area and a work area required for the operation of the above program. The central processing unit 51 performs processing according to the program stored in the ROM 52. The bus 55 connects the above components to one another and transfers data among the components. The I/F 56 communicates with the scanner 10 and is realized by a USB interface as is the case with the interface unit 46 of the scanner 10, however, another interface such as an IEEE 1394 interface may be used. The I/F 57 is connected to an input unit 61 such as a mouse and a key board. The external storage apparatus 58 drives an external storage medium such as a floppy (registered trade mark) disk and a CD-ROM. If the control program is not previously stored in the ROM 52, but stored in the external storage medium, the I/F 57 reads and downloads the control program. The control program may be downloaded via a network connector (not illustrated) and a network.

The host PC 50 performs image processing such as a determination step for determining an object area and a first to a fourth area from the image read by the scanner 10 and a determination step for extracting feature quantities from the determined areas and determining whether the feature quantities are similar to each other based on a threshold value. Each step is performed by executing each process of the program in the host PC 50.

The following describes reading operation of the host PC 50 through the scanner 10. FIG. 4 is a flow chart illustrating the reading operation of the scanner 10 through the scanner 10. In step S1, an image is read by the scanner in which a single or a plurality of documents is placed on the document positioning glass plate G1 (reading step). The resolution of an image at the time of reading may be temporary one or a user's desired value. FIG. 5 illustrates an image 71 of a single document of a magazine and an image 72 of two photographic documents. The figures on the left in FIGS. 5, 8, and 9 correspond to a single document and those on the right correspond to a plurality of documents.

Figure 6:
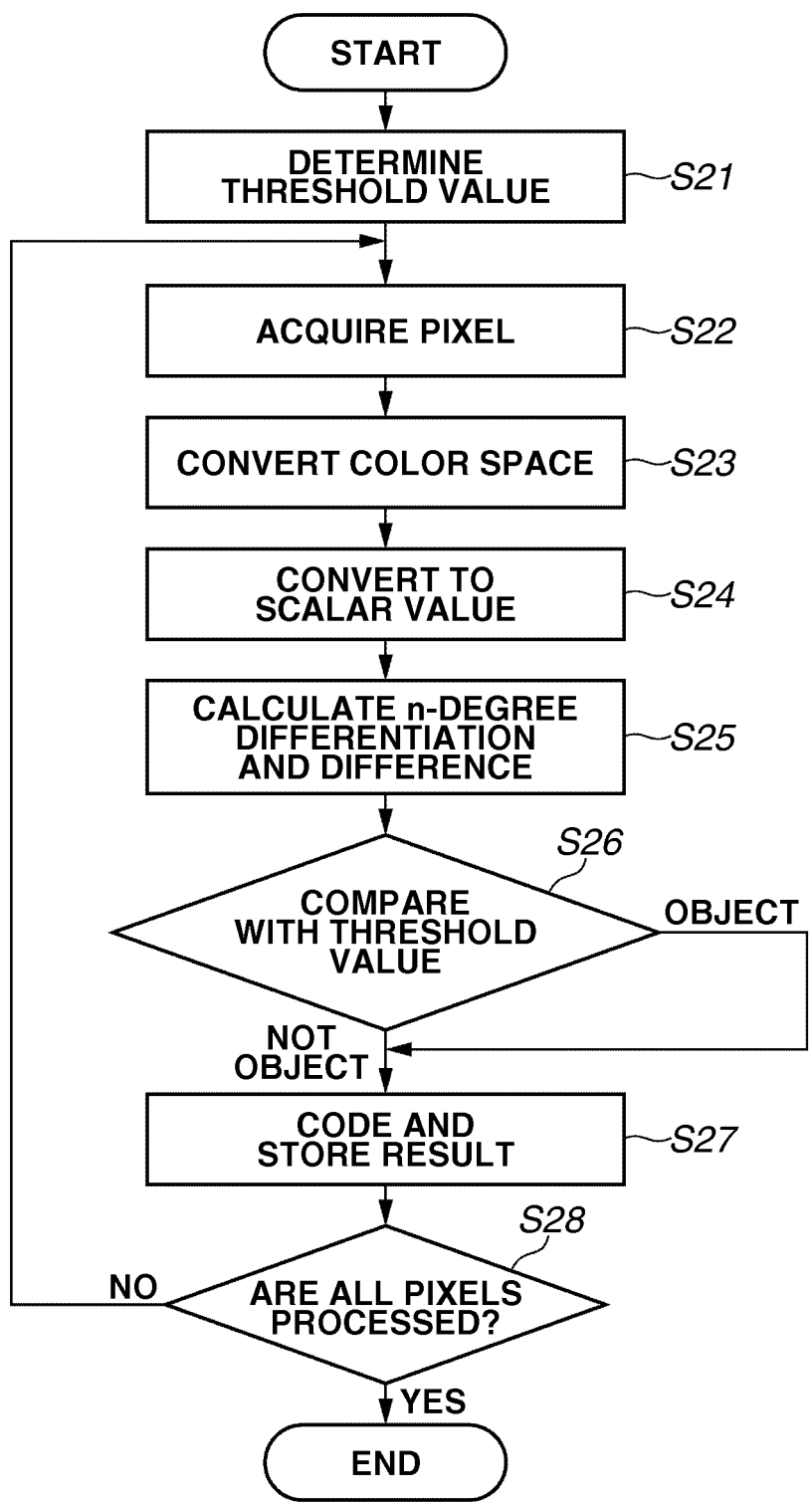
FIG. 6 is a flow chart illustrating the operation for extracting an object.

In step S2, an object is extracted from an image. The object is extracted in such a manner that an object area is determined from the image on the entire surface of the document positioning glass plate G1 read in step S1 and the contour line of the area is determined (a first determination step). The operation for extracting the object is described below. FIG. 6 is a flow chart illustrating the operation for extracting the object. In step S21, a threshold value for binarization is determined from an image. The threshold value varies depending on a comparison method in step 26 described later and an appropriate value is employed. A fixed value is previously determined to easily determine the threshold value. In step S22, the value of a pixel is acquired. Although all of the pixels need to be processed to extract objects from an image, in step S22, the processing can be made on a pixel-by-pixel basis. Typically, the position of a pixel is identified by using the X and the Y coordinate. When the processing is started, the X and the Y coordinate are initialized by an initial value (zero in general). The X and the Y coordinate are changed every time one pixel is processed. All of the pixels are scanned.

In step S23, the color space of the pixel value acquired in step S22 is converted. In general, color space for each scanner 10 is changed according to the characteristic of the line sensor 20, a color filter, and the reflective document light source 15. If a color space is independent of a device, it may extract an object independently of the scanner 10, so that the color space is converted in step S23. If a parameter dependent on the scanner 10 is adjusted and the threshold value in the processing in step S23 is determined, the processing in step S23 may be omitted. In step S24, the value acquired in step S23 is converted to a scalar value. If a color image is input, the color image has tricolor values of RGB. The RGB values are converted to scalar values to compare the RGB values (vector value) with the threshold value (scalar value). There are some methods for converting the RGB values to scalar values: a method for extracting any one of RGB values; a method for determining a luminance value by obtaining an appropriated weighted mean of RGB values; and a method for calculating color saturation from RGB values. If an input image is a single color like a gray scale, however, the processing is not required, so that the processing in step S24 may be omitted. In step S25, the n-degree differential and difference of the value acquired in step S24 are calculated. In the processing of extracting an image from an object, extracting a boundary between the reading document D1 placed on the transparent platen, and the other portion may facilitate accurately determining a document area thereafter. The n-degree differential and difference are calculated to extract the contour line of the reading document D1 placed on the transparent platen. The processing depends on the characteristic of the value acquired in step S24. If it is not required, the processing in step S25 may be omitted.

In step S26, the scalar value acquired in step S24 is compared with the threshold value determined in step S21. If the scalar value is smaller than the threshold value, it is determined that the image is not an object. If the scalar value is not smaller than the threshold value, it is determined that the image is an object. However, the relationship therebetween is reversed depending on values acquired in steps S23 to S25. For this reason, if the scalar value is smaller than the threshold value, it can be determined that the image is an object, and if the scalar value is greater than the threshold value, it can be determined that the image is not an object. The relationship is previously determined. For example, if the scalar value (the color space of an acquired pixel is converted and then this is converted to the scalar value) acquired in step S24 is a luminance value and the luminance value is smaller than the threshold value, it is determined that the image is an object. In other words, since the pressing plate is white and high in luminance value, it is determined that the pressing plate is not an object. If the scalar value acquired in step S24 is color saturation, and the color saturation is greater than the threshold value, it is determined that the image is an object. In other words, since the pressing plate is white and small in color saturation, it is determined that the pressing plate is not an object.

In step S27, the results acquired in step S26 are stored. Since only two kinds of the results are acquired in step S26: an object; or not an object, the results are stored such that an object is coded by zero and non-object is coded by one. In step S28, it is checked whether all the pixels are processed in step S27. If it is determined that all the pixels are processed (YES in step S28), the processing is ended.

Figure 5A:
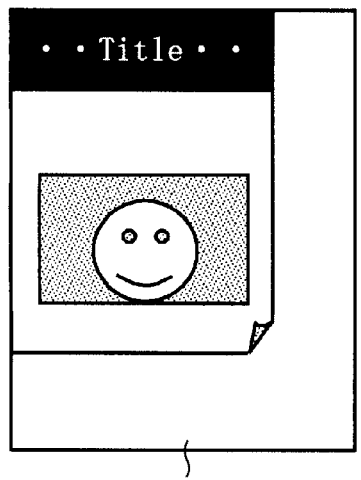
FIGS. 5A, 5B, 5C, and 5D illustrate images of a single document of a magazine and two photographic documents.
Figure 5B:
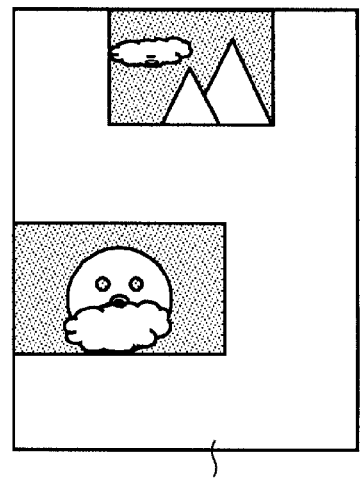
Figure 5C:
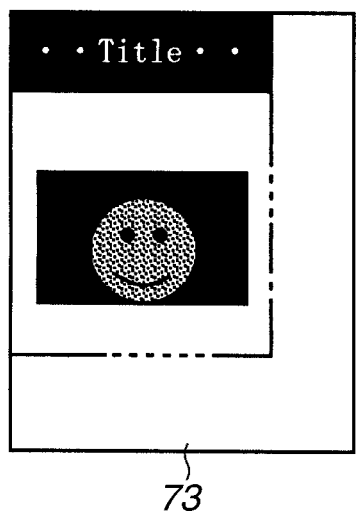
Figure 5D:
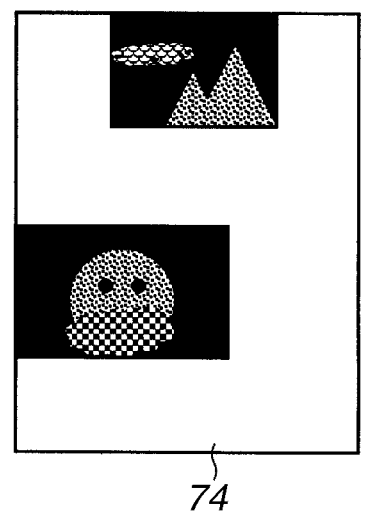

The processing basically proceeds in the order of the flow chart illustrated in FIG. 6 In some cases, however, the result in step S25 is required to determine the threshold value in step S21 and an adjacent pixel converted to a scalar value is required for calculation in step S25, for example. For this reason, the order of processing of the flow chart illustrated in FIG. 6 may be changed as needed. The flow chart illustrated in FIG. 6 is executed not only once, but twice or more as the case may be, in which internal processing may be changed. For example, at first processing, luminance is determined without conversion of color space and the processing is performed by a quadratic differential. At second processing, color space is converted, color saturation is determined and the processing skips over step S25. Thereafter, the logic product or the logic sum of the two results is obtained and synthesized. Whether the logic product or the logic sum is used depends on the coding in step S27, which is appropriately determined. FIGS. 5C and 5D illustrate an extraction result 73 obtained in the case where a single document of a magazine is placed and an extraction result 74 obtained in the case where a plurality of photographic documents is placed respectively. The black solid place is a place extracted as an object area (the first determination step).

Figure 7:
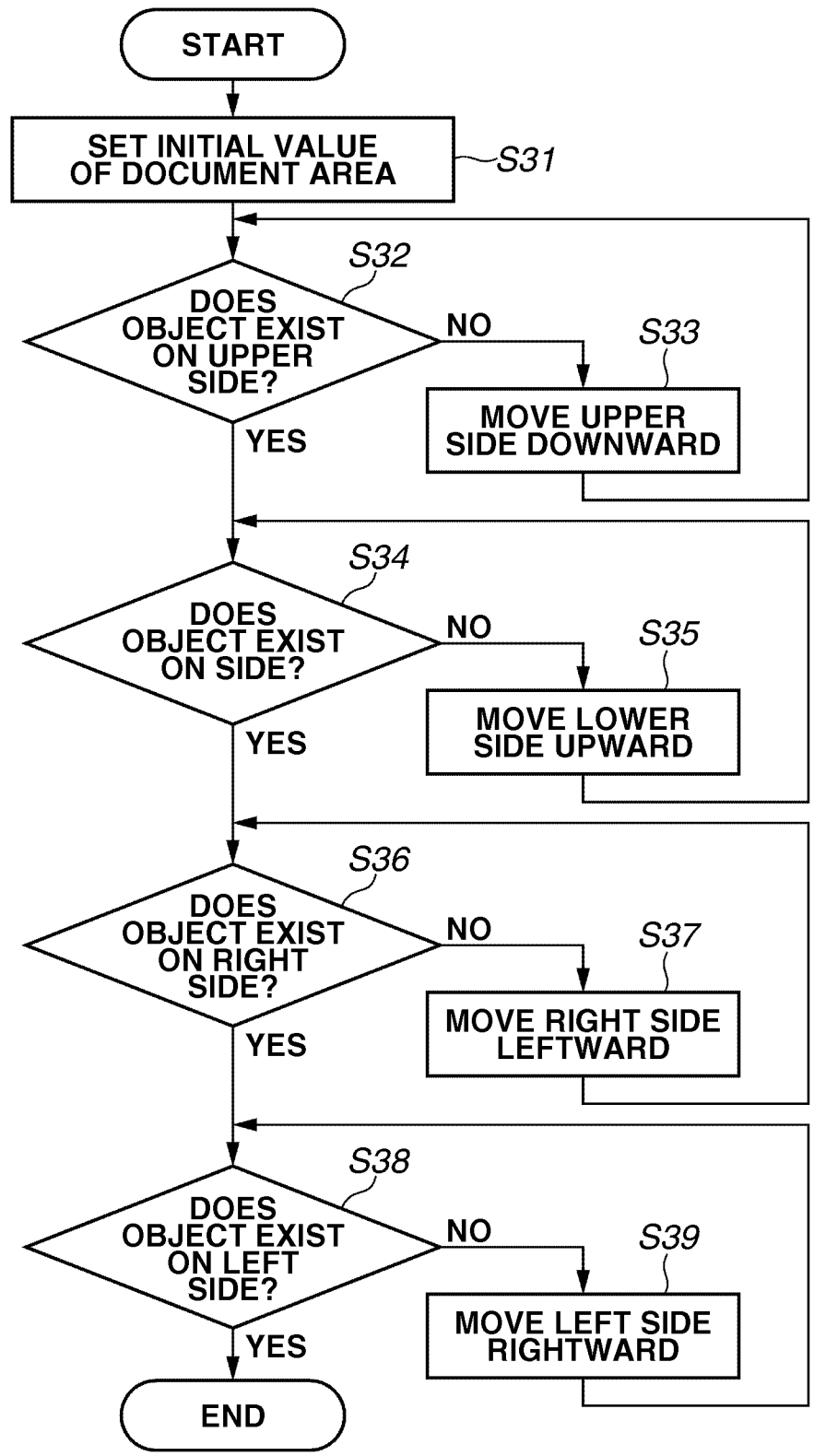
FIG. 7 is a flow chart illustrating processing for determining a document area.

In step S3, the document areas of all the extracted objects are determined by a document area determination unit used for a single reading document D1. Processing for determining a document area is described below. FIG. 7 is a flow chart illustrating processing for determining a document area. In step S31, an initial value of a document area is set. The area of the entire surface of the transparent platen (i.e., the zero-th area and a transparent platen image) is set as the initial value of a document area. In step S32, it is determined whether the object extracted in step S2 (in this case, "the object" is the area extracted in the flow chart in FIG. 6) exists on the upper side of the document area. If the object does not exist on the upper side (NO in step S32), the processing proceeds to step S33. If the object exists on the upper side (YES in step S32), the processing proceeds to step S34. In step S33, the upper side of the document area is moved downward. If the accuracy of the document area is one pixel, the upper side is moved by one pixel. After that, the processing proceeds to step S32. The upper side of the document area can be obtained by the processing in steps S32 and S33. In step S34, it is determined whether the object extracted in step S2 exists on the lower side of the document area. If the object does not exist on the lower side (NO in step S34), in step S35, the lower side of the document area is moved upward. If the object exists on the lower side (YES in step S34), the processing proceeds to step S36. If the accuracy of the document area is one pixel when the lower side of the document area is moved upward in step S35, the lower side is moved by one pixel. After that, the proceeding returns to step S34. The lower side of the document area can be obtained by the processing in steps S34 and S35.

In step S36, it is determined whether the object extracted in step S2 exists on the right side of the document area. If the object does not exist on the right side (NO in step S36), in step S37, the right side is moved leftward and the processing returns to step S36. If the object exists on the right side (YES in step S36), the processing proceeds to step S38. If the accuracy of the document area is one pixel when the right side of the document area is moved leftward in step S37, the right side is moved by one pixel. After that, the proceeding returns to step S36. The right side of the document area can be obtained by the processing in steps S36 and S37. In step S38, it is determined whether the object extracted in step S2 exists on the left side of the document area. If the object does not exist on the left side (NO in step S38), in step S39, the left side is moved rightward. If the object exists on the left side (YES in step S38), the processing is ended. If the accuracy of the document area is one pixel when the left side of the document area is moved rightward in step S39, the left side is moved by one pixel. The left side of the document area can be obtained by the processing in steps S38 and S39.

Figure 8A:
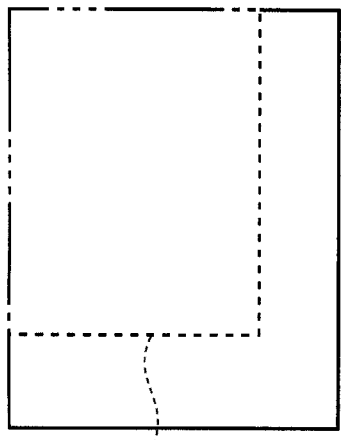
FIGS. 8A, 8B, 8C, 8D, 8E, and 8F illustrate each area according to the exemplary embodiment.
Figure 8B:
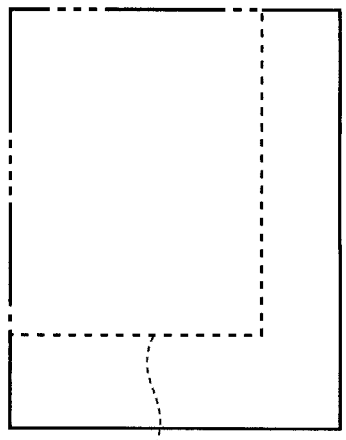

FIGS. 8A and 8B are respectively schematic diagrams illustrating a first area R11 obtained from the image read when a single document of a magazine is placed on the transparent platen, and a first area R12 obtained from the images read when a plurality of photographic documents is placed thereon. The first area R11 includes an object. The first area R12 also includes an object. In FIG. 8, an area surrounded by a dotted line is a document area. The area obtained here is referred to as "single document area" (a first area) (a second determination step). The extraction result 73 illustrated in FIG. 5C indicates an area in which the border line is seemingly discontinuous (area indicated by a discontinuous line), but judging from FIG. 8A, the area R11 illustrated therein is appropriate. In other words, since parts of the upper, lower, right, and left sides of a document can be extracted in the extraction result 73 illustrated in FIG. 5C, a minimum rectangle including an object can be obtained.

In step S4, the number of the extracted objects is counted. The result extracted in step S2 may be used as the extracted object, or an extraction result may be obtained using the extraction method used in step S2 changing the setting for extraction. When the number of objects is counted, labeling processing is used, which is often used for image processing. The labeling processing provides adjacent pixels which form the object, with the same label number. In step S5, a document area including one object is determined by a document area determination unit used for a plurality of documents. In other words, the area including the object is narrowed down. The same method as that in step S3 is employed, for example. If a photograph is placed on the tilt, the document area can be determined (in a rectangular form) with the document area tilted. If it is determined that the determined document area is incorrect, an edge may be excluded. For example, if an aspect ratio of a rectangle is equal to or smaller than a fixed value or rectangles do not contact each other, it may be determined that the determined document area is incorrect.

Figure 8C:
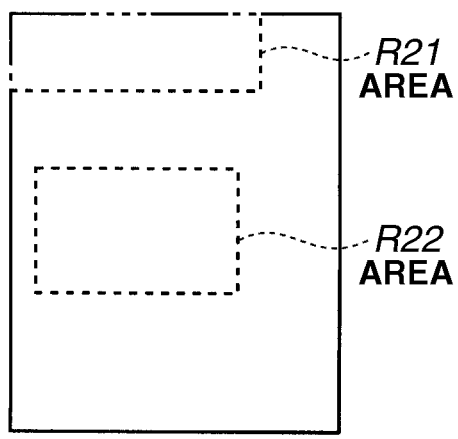
Figure 8D:
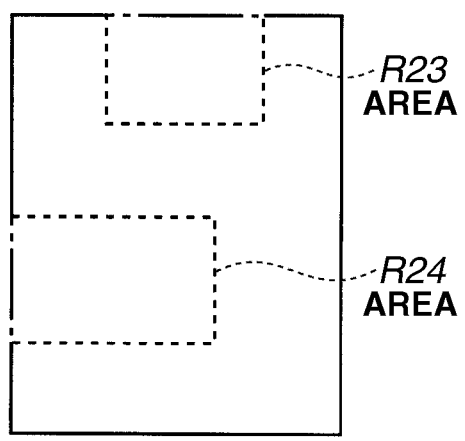

FIGS. 8C and 8D are schematic diagrams illustrating second areas R21 and R22 (FIG. 8C) obtained from the image read when a single document is placed on the transparent platen and second areas R23 and R24 (FIG. 8D) obtained from the image read when a plurality of documents is placed thereon. The second area R21, R22 is a set of the areas of a plurality of objects. The second areas R23 and R24 are also sets of the areas of plural objects. An area surrounded by a dotted line is a document area. It is obvious that the area is different from the single document area obtained in step S5. Although the lower and the right side of the document are extracted in the extraction result 73 illustrated in FIG. 5, the lower and the right side of the document are not reflected in FIG. 8C. In this case, it is determined that the lines of edges of the document are not objects to be read and removed from the areas R21 and R22 because the aspect ratio of the rectangle is extremely large. In the second areas R23 and R24 in FIG. 8D, it is obvious that the image obtained when a plurality of documents is placed is appropriately processed in the areas obtained in step S5. More specifically, the contour positions of the images illustrated in FIGS. 5A and 5B are similar to the areas R21 and R24 illustrated in FIGS. 8C and 8D, so that it is clear that the determined areas are correct. The areas depend on the extraction area in step S2 and can be correctly processed depending on the extraction area. In this case, it is supposed that the areas are not correctly processed. The area obtained here is referred to as "document areas of plural documents" (a second area) (a third determination step).

In step S6, the document areas of all of the counted objects are determined and then the processing proceeds to step S7. An entire area (the zero-th area, R23, and R24) to be read, from which the single document area determined in step S3 is removed, is referred to as "area excluding a single document area" (a third area) (R32). In step S7, the area excluding a single document area is subjected to a statistical processing and a feature quantity (a first feature quantity) is obtained (a fourth determination step). A luminance histogram of the area excluding a single document area is calculated.

Figure 8E:
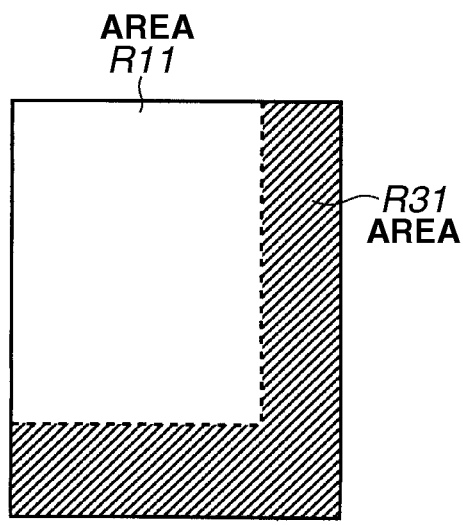
Figure 8F:
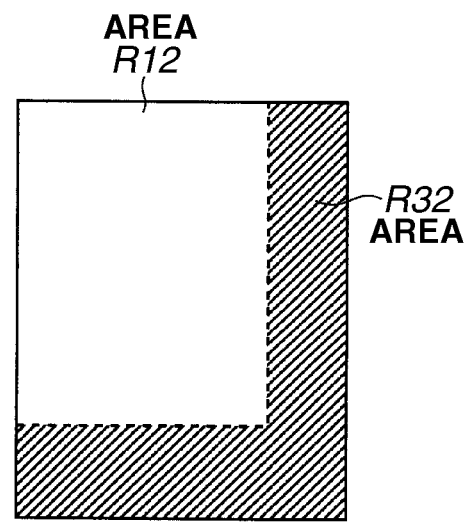

FIGS. 8E and 8F are schematic diagrams respectively illustrating an area R31 (a third area) calculated from the image of a single document placed on the transparent platen and an area R32 (a third area) calculated from the images of a plurality of documents placed thereon. The R31 (the third area) is an area in which the first area is removed from the image on the transparent platen. The R32 (the third area) is also an area in which the first area is removed from the image on the transparent platen. The luminance histogram is determined with respect to a striped area.

Figure 9A:
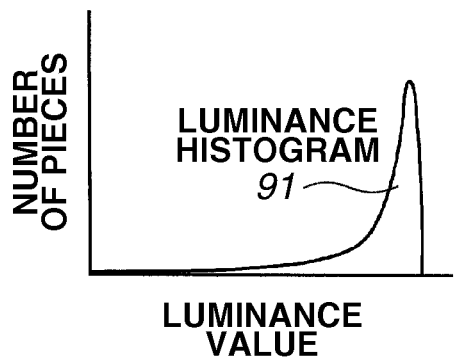
FIGS. 9A, 9B, 9C, 9D, 9E, 9F, 9G, and 9H illustrate luminance histograms and cumulative histograms according to the exemplary embodiment.
Figure 9B:
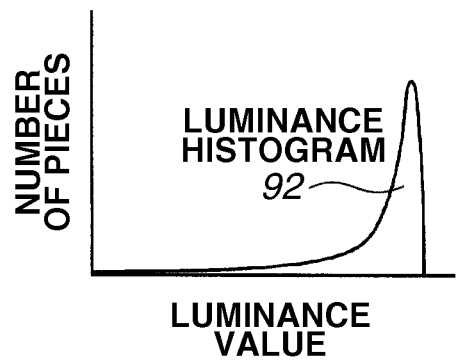

FIGS. 9A and 9B illustrate the calculated results of luminance histograms of the area excluding a single document area. A luminance histogram 91 is a result calculated from the area R31. A luminance histogram 92 is a result calculated from the area R32. In both of the histograms, since the area excluding a single document area substantially corresponds to a member for pressing the document, it is clear that the luminance histograms 91 and 92 are similar to each other. If there is no enough area to calculate a histogram (i.e., an area except a predetermined edge) in the above area excluding a single document area, a predetermined histogram is taken as a calculated result. The predetermined histogram is the one in which the image of a member for pressing a document is read with no document placed. An area in which the document areas of plural documents determined in step S5 are removed from the entire area obtained by reading the document positioning glass plate G1 is referred to as "area excluding document areas of plural documents." An area (striped area in FIGS. 9C and 9D) in which the area excluding a single document area is removed from the area excluding document areas of plural documents is referred to as "difference area" (a fourth area).

In step S8, a feature quantity (b) (a second feature quantity) is extracted from the difference area. In other words, the area excluding a single document area is subjected to a statistical processing and the feature quantity (b) is obtained. In step S9, the feature-quantity statistically processed in step S8 is compared with the feature-quantity obtained in step S7 and statistically processed. The processing in step S7 is executed to calculate the luminance histogram of the difference area (a fifth determination step).

Figure 9C:
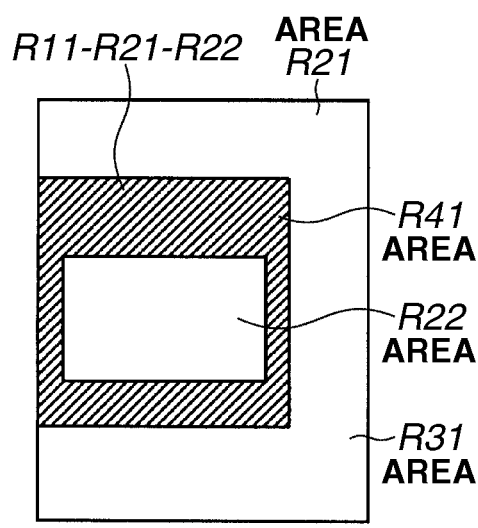
Figure 9D:
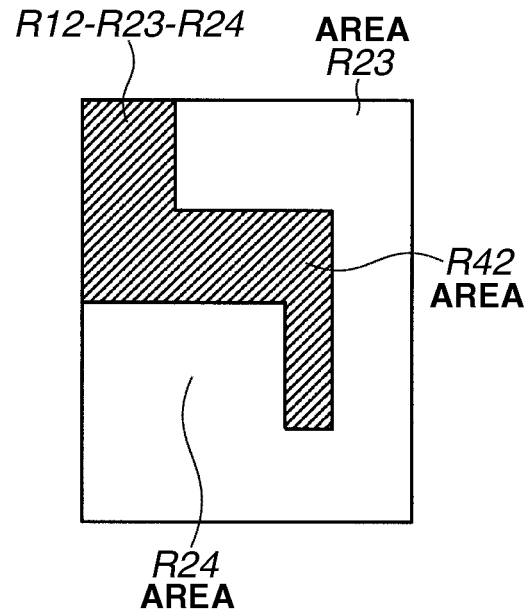

FIGS. 9C and 9D are schematic diagrams illustrating a fourth area R41 in which an image of a single document placed on the transparent platen is calculated and a fourth area R42 in which an image of a plurality of documents placed thereon is calculated. The fourth area R41 is the one in which the second and the third area are removed from the image of the transparent platen. The fourth area R42 is the one in which the second and the third area are removed from the image of the transparent platen. A feature quantity is determined from the striped area.

Figure 9E:
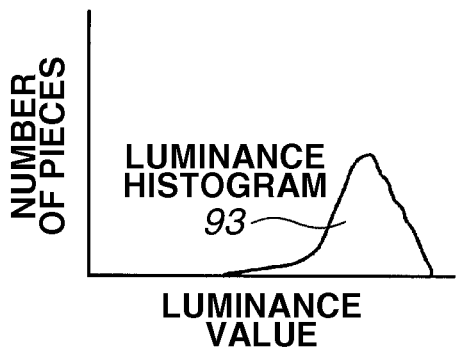
Figure 9F:
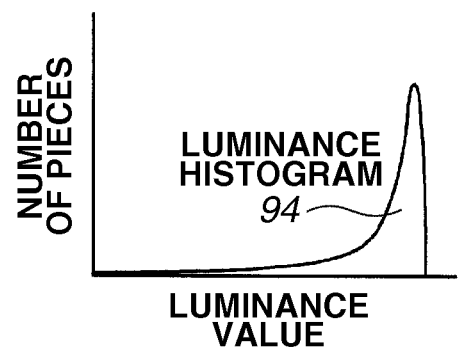

FIGS. 9E and 9F illustrate the calculated results of luminance histograms 93 and 94 of the difference area. The luminance histogram 93 is determined as to the inside of the document of a magazine. The luminance histogram 93 is the result calculated from the area 41. The fourth area R41, which is the difference area is equal to (R11−R21−R22) and is the one in which the areas R21 and R22 are subtracted from the area R11. The luminance histogram 94 is obtained from a member for pressing a document. The luminance histogram 94 is the result calculated from the area 42. The fourth area R42, which is the difference area is equal to (R12−R23−R24) and is the one in which the areas R23 and R24 are subtracted from the area R12. Thus, from the above figures, it can be seen that the luminance histograms 93 and 94 have a distribution different from each other.

In step S9, the feature quantity obtained in step S7 is compared with the feature quantity obtained in step S8 to determine whether they are different from each other. If it is determined that they are different (YES in step S9), the proceeding proceeds to step S10. If it is determined that they are not different (NO in step S9), the proceeding proceeds to step S11. A normalized cumulative histogram is used for the above comparison so that the sum total of the obtained luminance histograms becomes one.

Figure 9G:
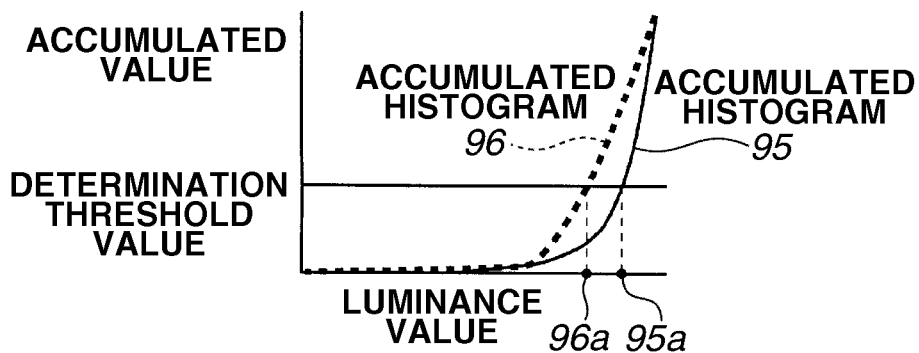
Figure 9H:
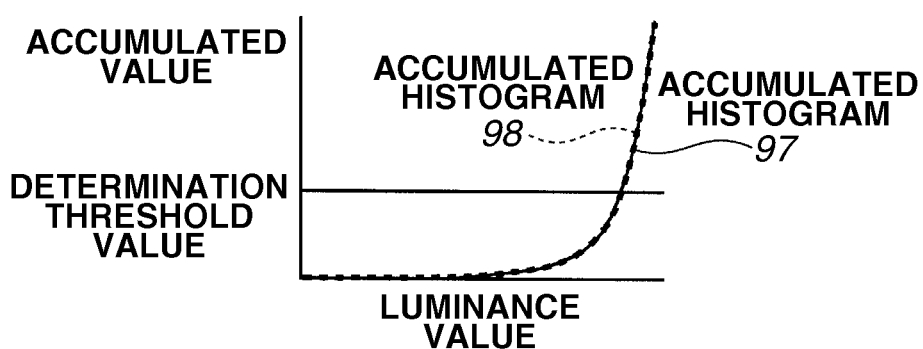

FIGS. 9G and 9H illustrate normalized cumulative histograms 95, 96, 97, and 98. The cumulative histogram 95 represented by the solid line is the cumulative histogram of the luminance histogram 91 (normalized by indicating the brightest place as one). The cumulative histogram 96 represented by the dotted line is the cumulative histogram of the luminance histogram 93. The cumulative histogram 97 represented by the solid line is the cumulative histogram of the luminance histogram 92. The cumulative histogram 98 represented by the dotted line is the cumulative histogram of the luminance histogram 94. A luminance value at which a cumulative histogram exceeds a determination threshold value is determined below. A luminance value (95a) (a first feature quantity) at which the cumulative histogram 95 exceeds the determination threshold value is compared with a luminance value (96a) (a second feature quantity) at which the cumulative histogram 96 exceeds the determination threshold value, as their respective feature quantities. In FIG. 9G, the feature quantities of both are different. In FIG. 9H, a luminance value (a first feature quantity) at which the cumulative histogram 97 exceeds the determination threshold value is nearly equal to a luminance value (a second feature quantity) at which the cumulative histogram 98 exceeds the determination threshold value. The cumulative histogram 95 of the area R31 (the back side of the pressing plate 14) and the cumulative histogram 96 of the area R41 (the area of R11−R21−R22 and the background portion inside the document) are images obtained by reading different ones. The cumulative histogram 97 of the area R32 (the back side of the pressing plate 14) and the cumulative histogram 98 of the area R42 (the area of R12−R23−R24 and the back side of the pressing plate 14) are images obtained by reading the same objects which are on the back side of the pressing plate 14 (their positions are different, however). If a determined difference between the luminance values at which the cumulative histograms exceed the determination threshold value falls within a predetermined determination threshold value (a first threshold value), it is determined that the feature quantities obtained in steps S7 and S8 are equal to each other. If a determined difference between the luminance values exceeds the predetermined determination threshold value (the first threshold value), it is determined that the feature quantities obtained in steps S7 and S8 are different from each other. As another determination method, if a luminance value at which a cumulative histogram exceeds a determination threshold value is smaller than a third predetermined threshold value, it is determined that the feature quantities obtained insteps S7 and S8 are different from each other. In this case, if the luminance value is not smaller than another predetermined threshold value, it may be determined that the feature quantities obtained in steps S7 and S8 are equal to each other. In this case, a value between the luminance values 95a and 96a are determined as another predetermined threshold value.

In step S10, it is determined that the single document area determined in step S3 is a document area. In step S11, the plural document area determined in step S5 is a document area (determination step). Although not illustrated in particular, image processing can be subsequently performed based on the document area determined in steps S10 or S11. If the resolution of the image read in step S1 is temporary, the document area determined in steps S10 or S11 may be read by a desired resolution. If the document area determined in steps S10 or S11 is oblique, the image may be rotated to correct the obliqueness.

Figure 10:
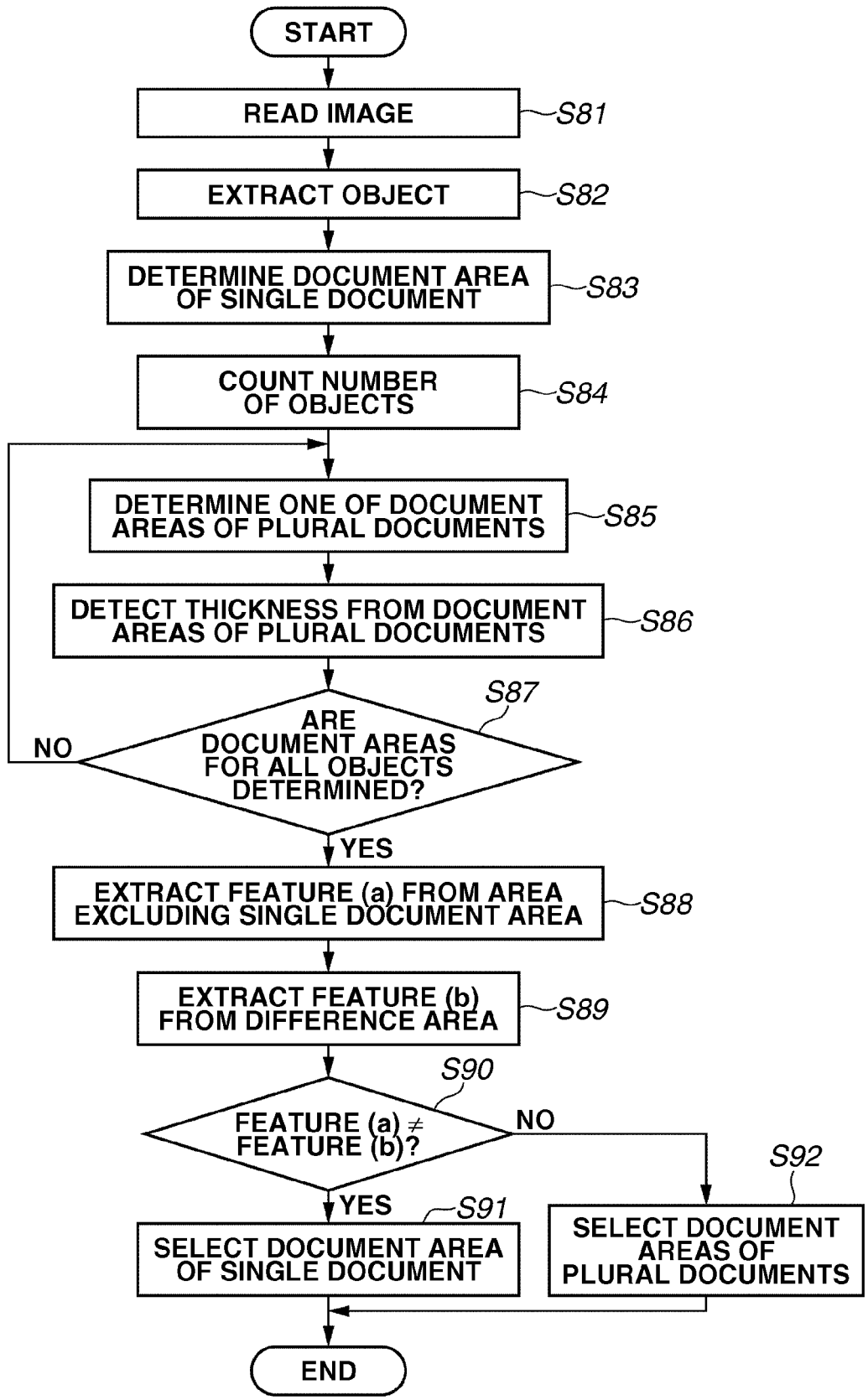
FIG. 10 is a flow chart illustrating a reading operation according to the exemplary embodiment.
Figure 11A:
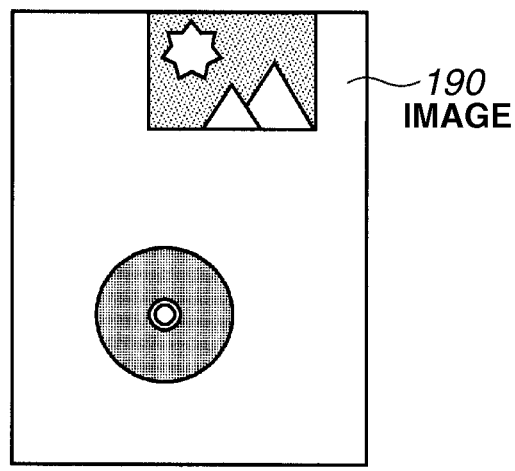
FIGS. 11A, 11B, and 11C illustrate a document and an area obtained from a read image according to the exemplary embodiment.
Figure 11B:
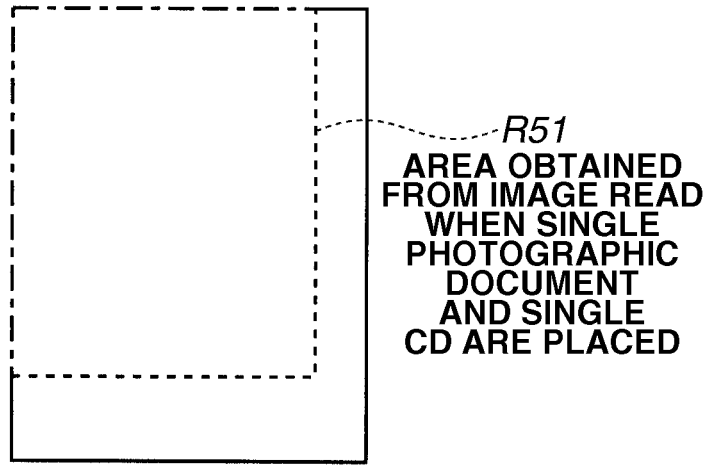
Figure 11C:
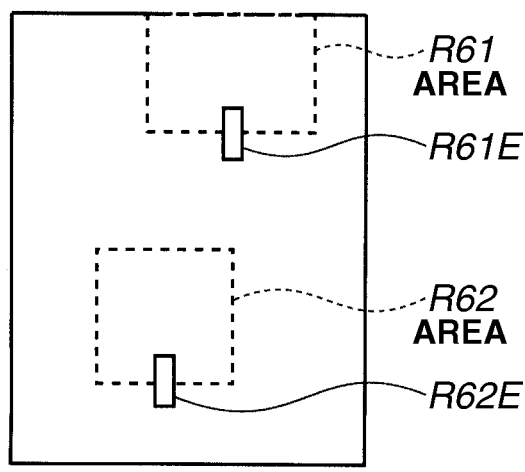

The operation of reading a thick document by the host PC 50 is described below. FIG. 10 is a flow chart illustrating the operation of reading a document by the host PC 50. The processing in steps S81 to S85 is similar to that in steps S1 to S5 in FIG. 4. FIG. 11A illustrates an image 190 read from a single photographic document and CD (compact disc) when they are placed on the plate. The CD is 1 mm in thickness. A several-millimeter-thick DVD or cardboard are also handled as a thick document similarly to the CD. FIG. 11B illustrates a first area R51 obtained from the read image. The first area R51 is the one including an object. In FIG. 11B, the area surrounded by the dotted line is referred to as "single document area." FIG. 11C illustrate objects of the areas R61 and R62 obtained from the read images. The set of the areas R61 and R62 is a second area. The area surrounded by the dotted line is a document area. The area obtained here is referred to as "document areas of plural documents." A rectangular area including a circular CD is a rectangle of the area R62.

Figure 12:
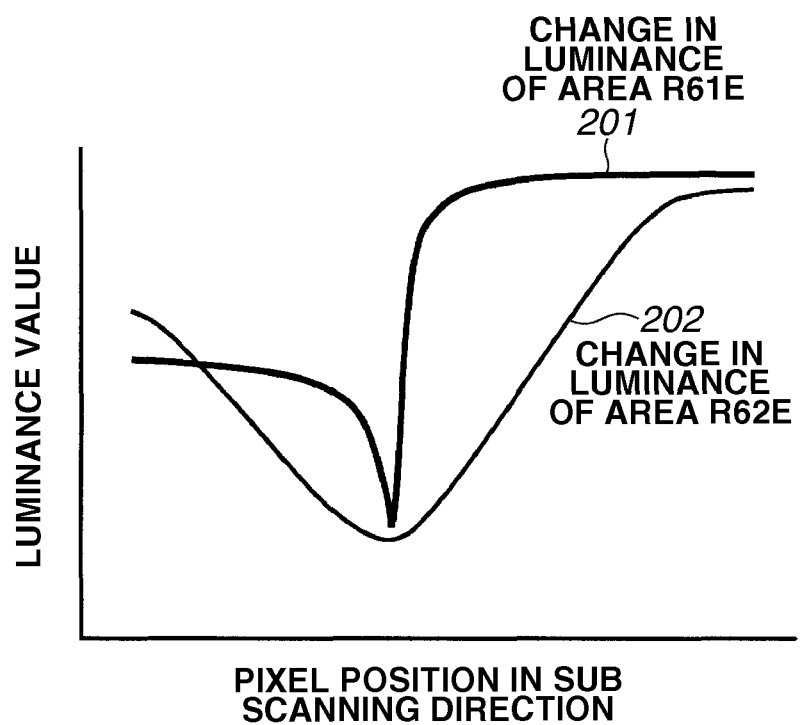
FIG. 12 is a chart illustrating the luminance value at an area boundary according to the exemplary embodiment.
Figure 13:
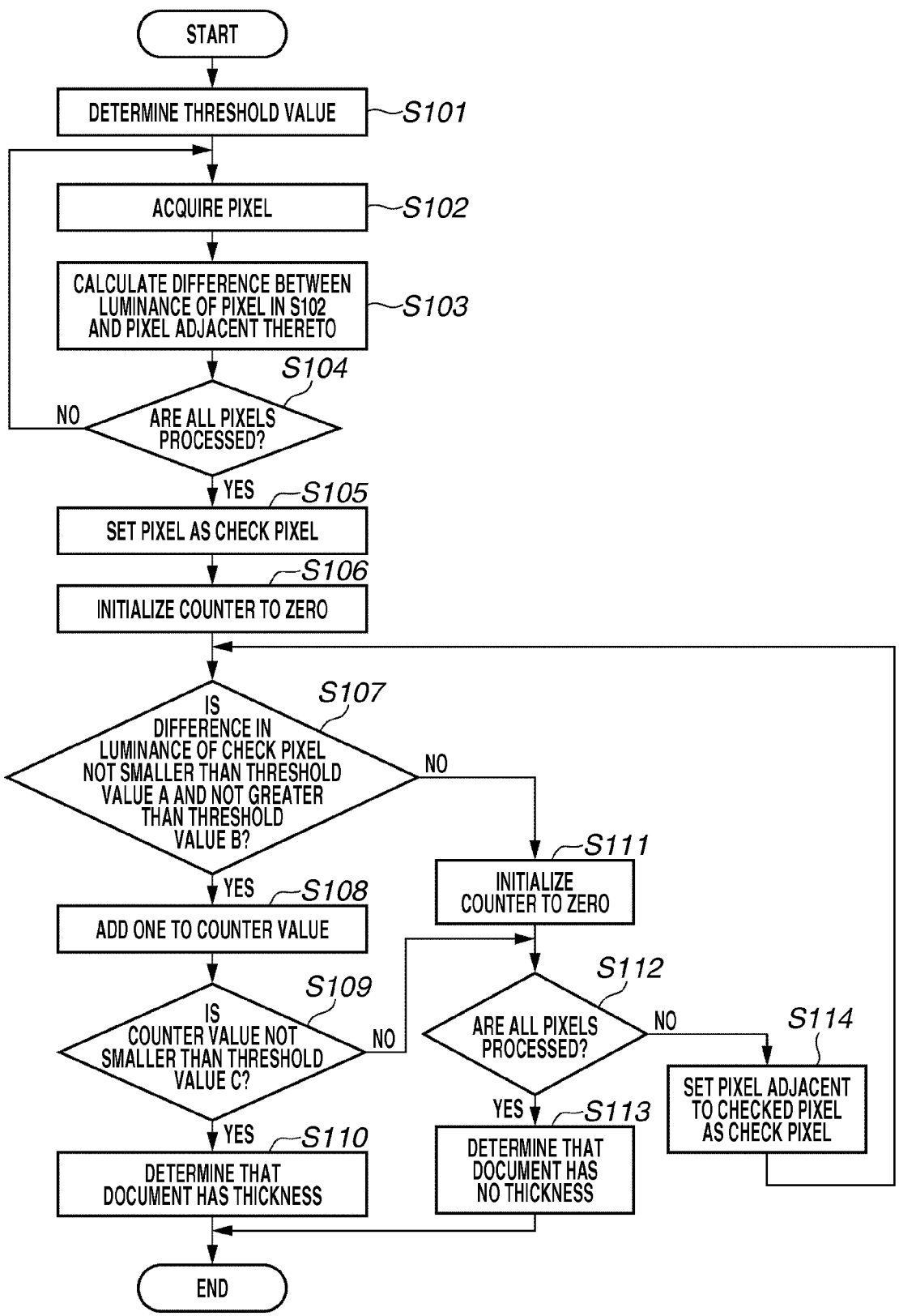
FIG. 13 is a flow chart illustrating thickness detection processing according to the exemplary embodiment.

In step S86, thickness is detected in document areas of plural documents by a document thickness detection unit. The processing for detecting the thickness of a document is described below. FIG. 12 illustrates a relationship between luminance and a pixel position of R61E portion around the periphery of the area R61, and a relationship between luminance and a pixel position of R62E portion around the periphery of the area R62. The area R61 is the one in which a thin photographic document is extracted as an object. For this reason, a luminance change 201 in the area R61 is clear on the boundary between the photographic document and the other portion and tends to be steep in slope. The area R62 is the one in which a thick CD is extracted as an object. Although the CD is covered by the pressing plate (platen cover) 14, the pressing plate 14 cannot be brought into close contact with document positioning glass plate G1. For this reason, the CD projects a shadow in the area reflected from the pressing plate 14. As illustrated in FIG. 1, when the reflective document light source 15 illuminates from an upstream side in the sub scanning direction X, a shadow is generated on a downstream side. External light may enter through a gap. As a result, a shadow is generated around the area R62 when the scanner 10 reads. As to luminance change 202 in the area R62, the luminance of the boundary between the CD and the other portion tends to gradually change and to be gentle in slope. This is used to detect the shadow so as to detect thickness. FIG. 13 is a flow chart illustrating thickness detection processing. A several-millimeter-size area is sampled as the areas R61E and R62E at the center position in the main scanning direction and in the downstream side in the sub scanning direction to check influence around the periphery of the rectangular area even if a CD is circular. The processing in FIG. 13 is performed for pixels forming the areas R61E, and R62E.

In step S101, a maximum luminance difference value B, a minimum luminance difference value A, and the number of continuous lower numbers C are determined to make determination of a shadow area due to thickness. When a group of C pixels or more continues in which luminance difference value of a pixel is between a value A or greater, and a value B or smaller, it is determined that a relationship between the pixel value and the luminance is gentle in slope as described above and the pixel group is detected as a thick area. In step s102, the position of a pixel is identified using the coordinates X and Y. At the time of starting the processing, the coordinates X and Y are initialized by an initial value. Every time one pixel is processed, the coordinates X and Y are changed to scan all the pixels. In step S103, a difference (a luminance difference value) between the luminance value of the pixel acquired in step S102 and the luminance value of the pixel adjacent to the acquired pixel is calculated. A difference with the adjacent pixel is calculated in the sub scanning direction of the scanner in which thickness tends to generate a shadow. In step S104, it is checked whether all the pixels are processed in step S103. If all the pixels are processed (YES in step S104), the processing proceeds to step S105. In step S105, a pixel is set as a check pixel. In step S106, a counter for counting the number of continuous pixels determined as shadows in step S106 is initialized to zero.

In step S107, it is determined whether the luminance difference value of the check pixel is equal to or greater than the threshold value A, and equal to the threshold value B or less. If the luminance difference value satisfies the above condition (YES in step S107), it is determined that the check pixel is a shadow and the processing proceeds to step S108. If the luminance difference value does not satisfy the above condition (YES in step S107), it is determined that the check pixel is not a shadow and the processing proceeds to step S111. In step S108, one is added to the counter, which counts the number of continuous pixels determined as shadows. In step S109, it is determined whether the value of the counter which counts the number of continuous pixels determined as shadows is equal to or greater than the threshold value C. If the value of the counter satisfies the above condition (YES in step S109), the processing proceeds to step S110 to determine that thickness exists and the processing is ended. If the value of the counter does not satisfy the above condition (NO in step S109), the processing proceeds to step S112. In step S111, the counter for counting the number of continuous pixels determined as shadows is initialized to zero. In step S112, it is checked whether all the pixels are processed in step S107. If all the pixels are processed (YES in step S112), in step S113, it is determined that thickness does not exist and the processing is ended. If all the pixels are not processed (NO in step S112), the processing proceeds to step S114. In step S114, the pixel adjacent to the pixel set as the check pixel is set as the next check pixel. In general, the pixel which is adjacent in the sub scanning direction of the scanner and tends to generate a shadow due to thickness is set.

In step S87, if the document area of all the counted objects is determined and the thickness thereof is detected, the processing proceeds to step S88. The thickness of the area where a CD is detected as an object is detected. An area in which the single document area determined in step S83 is removed from all of the areas to be read, is referred to as "area excluding a single document area." In step S88, the area excluding a single document area is statistically processed to determine feature quantity (luminance). The luminance histogram of the area excluding a single document area is calculated. An area in which the document areas of plural documents determined in step S85 are removed from all of the areas to be read, is referred to as "area excluding document areas of plural documents." An area excluding document areas of plural documents from which the area excluding a single document area is removed is referred to as "difference area." In step S89, the difference area is statistically processed to determine feature quantity (luminance). The luminance histogram of the difference area is calculated.

Figure 14A:
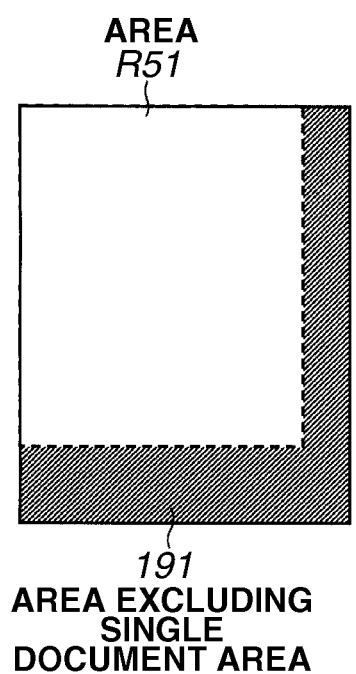
FIGS. 14A, 14B, 14C, 14D, 14E, and 14F illustrate each area, histograms, and cumulative histograms according to the exemplary embodiment.
Figure 14B:
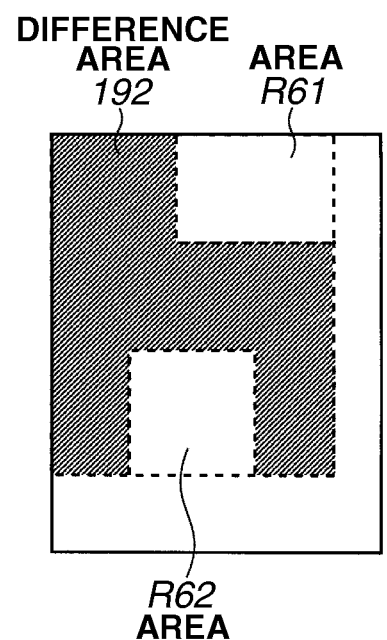
Figure 14C:
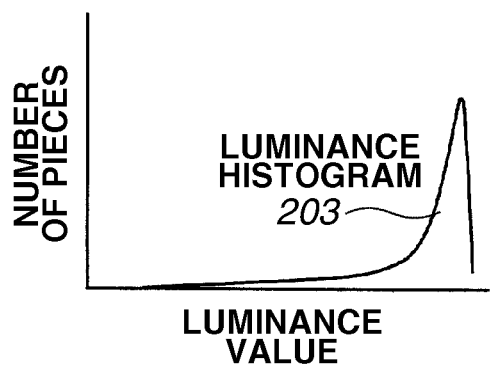
Figure 14D:
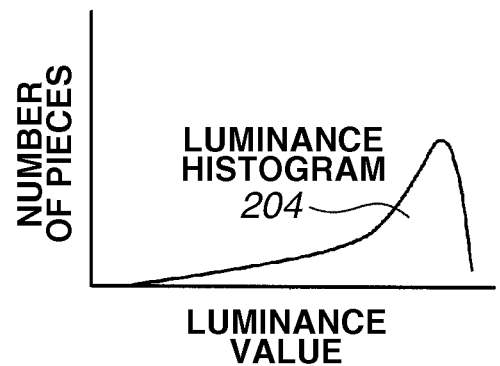

FIGS. 14A and 14B illustrate "an area excluding a single document area 191" and a difference area 192 respectively. In FIGS. 14A and 14B, a luminance histogram is obtained from a meshed area. Although statistically processed features are compared in step S90, which will be described below, satisfactory features in step S90 may be obtained in steps S88 and S89. FIGS. 14C and 14D illustrate the calculated results of the luminance histogram 203 of the area excluding a single document area and the luminance histogram 204 of the difference area respectively. Since the area excluding a single document area substantially corresponds to a member for pressing the document, the luminance histogram 203 is substantially similar to the histogram of the member for pressing the document. Although the difference area substantially corresponds to the member for pressing the document, since the thick CD is placed on the plate, the shadow portion is included therein. The histograms 203 and 204 are differently distributed only depending on the presence or absence of a shadow. If the thick CD is not placed on the plate, the histograms 203 and 204 substantially correspond to each other.

Figure 14E:
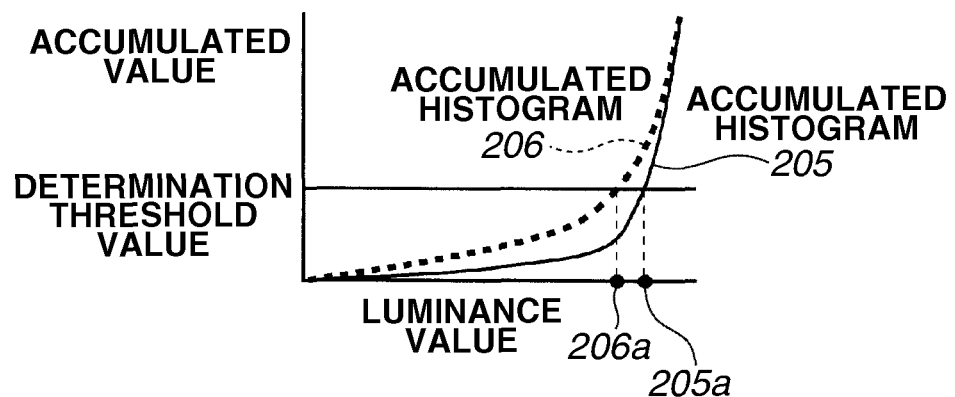
Figure 14F:
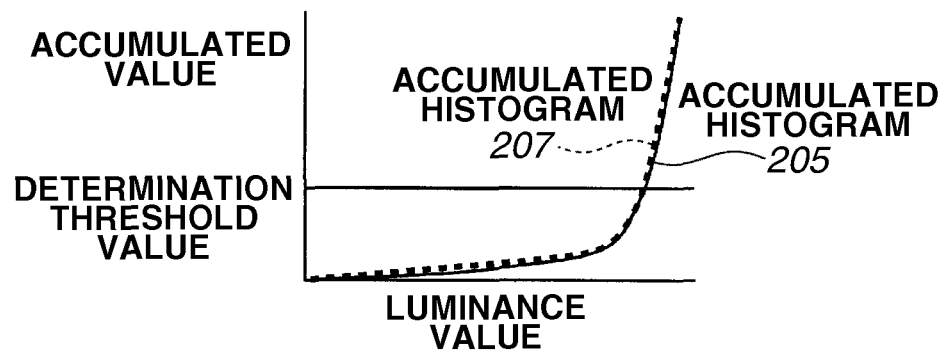

In step S90, the feature quantities obtained insteps S88 and S89 are compared with each other to determine whether the feature quantities are different from each other. If it is determined that the feature quantities are different (YES in step S90), the processing proceeds to step S91. If it is determined that the feature quantities are not different (NO in step S90), the processing proceeds to step S92. A normalized cumulative histogram is used for the above comparison so that the sum total of the obtained luminance histograms becomes one. FIGS. 14E and 14F illustrate results of the normalized cumulative histograms. The cumulative histograms 205 represented by the solid line are the cumulative histograms of the luminance histogram 203. The cumulative histogram 206 represented by the dotted line is the cumulative histogram of the luminance histogram 204. A luminance value at which a cumulative histogram exceeds a determination threshold value is determined below. A luminance value (205a) at which the cumulative histogram 205 exceeds the determination threshold value (a third threshold value) is different from a luminance value (206a) at which the cumulative histogram 206 exceeds the determination threshold value (the third threshold value). If the thick CD is not placed, the cumulative histogram of the difference area shows a distribution 207 and the luminances at which the cumulative histograms exceed the determination threshold value substantially correspond to each other. If a determined difference between the luminance values falls within a predetermined threshold value, it is determined that the feature quantities obtained in steps S88 and S89 are equal to each other. The threshold value of the difference between luminance values at which it is determined that feature quantities are equal to each other, is adjusted by using the detected thickness obtained in step S86. If thickness is detected, the cumulative histogram 206 is different from the cumulative histogram 205 due to the influence of the shadow. Accordingly, the threshold value is increased to remove the influence of the shadow (a second threshold value). As a result, it can be determined that the feature quantities which are different only due to the influence of the shadow are equal to each other. The adjustment quantity of the threshold value may be increased by a predetermined fixed quantity if thickness is detected. Alternatively, adjustment quantity may be dynamically calculated from the size of document areas of plural documents where thickness is detected and the number of continuous pixels determined as a shadow area.

In step S91, it is determined that the single document area determined in step S83 is a document area. In step S92, it is determined that the document areas of plural documents determined in step S85 is a document area. Although not illustrated in particular, image processing may be subsequently performed based on the document area determined in steps S91 or S92. If the resolution of the image read in step S81 is temporary one, the document area determined in steps S91 or S92 may be read by a desired resolution. If the document area obtained in steps S91 or S92 is oblique, the image may be rotated to correct the obliqueness.

Other Embodiments

The present invention can also be realized by supplying the software (program) which realizes the above-described functions of the present embodiments via network or various kinds of storage medium to a system or an apparatus, so that the system or a computer (or CPU, MPU and the like) can read and execute the supplied program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-159259 filed Jul. 3, 2009, which is hereby incorporated by reference herein in its entirety.

What is claimed is:

1. An image processing method, comprising:
    acquiring an image read by a reading apparatus, wherein the image is of a predetermined area of a platen that is covered by a platen cover and includes one original or plural originals;
    extracting, from the acquired image, each object area corresponding to at least one original in the acquired image;
    obtaining a first feature quantity corresponding to the platen cover;
    determining, in a case where a plurality of object areas are extracted from the acquired image, a second feature quantity of an image area that is within a first area containing the extracted plurality of object areas and is outside of each of the extracted plurality of object areas; and
    determining whether the acquired image includes one original or plural originals,
    wherein, in a case where a difference between the obtained first feature quantity corresponding to the platen cover and the second feature quantity of the image area that is outside of the extracted plurality of object areas is equal to or smaller than a predetermined threshold value, determining includes determining that the acquired image includes plural originals and that each extracted object area corresponds to one original from the plural originals.

2. The image processing method according to claim 1, wherein the second feature quantity of the image area is a luminance value at which a cumulative histogram exceeds a determination threshold value.

3. The image processing method according to claim 1, wherein the predetermined threshold value is determined according to a periphery image around a periphery of an object area within an original in the acquired image.

4. The image processing method according to claim 3, wherein the predetermined threshold value is determined according to a change of a luminance in the periphery image.

5. The image processing method according to claim 1, wherein the first feature quantity is obtained from the acquired image.

6. The image processing method according to claim 5, wherein the first feature quantity is obtained from the acquired image from a third area located outside of the first area containing the extracted plurality of object areas.

7. The image processing method according to claim 1, wherein, in a case where a difference between the first feature quantity corresponding to the platen cover and the second feature quantity of the image area that is outside of the extracted plurality of object areas is greater than the predetermined threshold value, determining includes determining that the acquired image includes one original and that each extracted object area corresponds to the one original.

8. The image processing method according to claim 1, further comprising outputting, for each image corresponding to an original of the plural originals, each image on an original-by-original basis.

9. The image processing method according to claim 1, further comprising:
    obtaining, using a minimum rectangle, the first area containing all extracted object areas, wherein the minimum rectangle is a smallest rectangle that can be circumscribed around all object areas such that all object areas are inside the rectangle or on a side of the rectangle so as to be bounded by the rectangle;
    counting, as a number, a quantity of all the extracted object areas in the first area; and
    obtaining, using a minimum rectangle, a second area for each extracted object area, wherein each second area for each extracted object area contains only one extracted object area,
    wherein, in a case where a difference between the first feature quantity corresponding to the platen cover and the second feature quantity of the image area that is outside of the extracted plurality of object areas is greater than the predetermined threshold value, determining includes determining that the acquired image includes one original and that each extracted object area corresponds to the one original.

10. The image processing method according to claim 1, wherein each object area includes a black solid place and any background portion of an original partially surrounded by the black solid place.

11. A non-transitory storage medium which can be read by an information processing apparatus connected to an image reading apparatus and to which a program code executed by the information processing apparatus is stored, the program code comprising:

acquiring an image read by a reading apparatus, wherein the image is of a predetermined area of a platen that is covered by a platen cover and includes one original or plural originals;

extracting, from the acquired image, each object area corresponding to at least one original in the acquired image, obtaining a first feature quantity corresponding to the platen cover;

determining, in a case where a plurality of object areas are extracted from the acquired image, a second feature quantity of an image area that is within a first area containing the extracted plurality of object areas and is outside of each of the extracted plurality of object areas; and determining whether the acquired image includes one original or plural originals, wherein, in a case where a difference between the obtained first feature quantity corresponding to the platen cover and the second feature quantity of the image area that is outside of the extracted plurality of object areas is equal to or smaller than a predetermined threshold value, determining includes determining that the acquired image includes plural originals and that each extracted object area corresponds to one original from the plural originals.

12. An image processing apparatus comprising:

an acquiring unit configured to acquire an image read by a reading apparatus, wherein the image is of a predetermined area of a platen that is covered by a platen cover and includes one original or plural originals;

an extracting unit configured to extract, from the acquired image, each object area corresponding to at least one original in the acquired image;

an obtaining unit configured to obtain a first feature quantity corresponding to the platen cover;

a determining unit configured to, in a case where a plurality of object areas are extracted from the acquired image, determine a second feature quantity of an image area that is within a first area containing the extracted plurality of object areas and is outside of each of the extracted plurality of object areas, and determine whether the acquired image includes one original or plural originals, wherein, in a case where a difference between the first feature quantity corresponding to the platen cover obtained by the obtaining unit and the second feature quantity of the image area that is outside of the extracted plurality of object areas is equal to or smaller than a predetermined threshold value, the determining unit determines that the acquired image includes plural originals and that each extracted object area corresponds to one original from the plural originals.

13. The image processing apparatus according to claim 12, wherein the second feature quantity of the image area is a luminance value at which a cumulative histogram exceeds a determination threshold value.

14. The image processing apparatus according to claim 12, wherein the predetermined threshold value is determined according to a periphery image around a periphery of an object area within an original in the acquired image.

15. The image processing apparatus according to claim 14, wherein the predetermined threshold value is determined according to a change of a luminance in the periphery image.

16. The image processing apparatus according to claim 12, wherein the first feature quantity is obtained from the acquired image.

17. The image processing apparatus according to claim 16, wherein the first feature quantity is obtained from the acquired image from a third area located outside of the first area containing the extracted plurality of object areas.

18. The image processing apparatus according to claim 12, wherein, in a case where a difference between the first feature quantity corresponding to the platen cover and the second feature quantity of the image area that is outside of the extracted plurality of object areas is greater than the predetermined threshold value, the determining unit determines that the acquired image includes one original and that each extracted object area corresponds to the one original.

* * * * *